United States Patent
Tsuboi et al.

(10) Patent No.: US 10,605,123 B2
(45) Date of Patent: Mar. 31, 2020

(54) THERMAL ENERGY RECOVERY DEVICE AND OPERATING METHOD OF THE SAME

(71) Applicant: Kobe Steel, Ltd., Hyogo (JP)

(72) Inventors: Noboru Tsuboi, Hyogo (JP); Masayoshi Matsumura, Hyogo (JP); Shigeto Adachi, Takasago (JP); Eiji Kanki, Hyogo (JP); Shirohiko Okamoto, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 475 days.

(21) Appl. No.: 15/473,660

(22) Filed: Mar. 30, 2017

(65) Prior Publication Data
US 2017/0298780 A1    Oct. 19, 2017

(30) Foreign Application Priority Data

Apr. 14, 2016  (JP) ................................ 2016-081352

(51) Int. Cl.
*F01K 13/02*    (2006.01)
*F01C 1/16*    (2006.01)
*F01K 7/36*    (2006.01)
*H02K 7/18*    (2006.01)

(52) U.S. Cl.
CPC ............... *F01K 13/02* (2013.01); *F01C 1/16* (2013.01); *F01K 7/36* (2013.01); *H02K 7/1823* (2013.01); *F04C 2270/701* (2013.01)

(58) Field of Classification Search
CPC .................................................... F01K 13/02
USPC .......... 60/645, 646, 652, 653, 657, 663, 670
See application file for complete search history.

(56) References Cited

U.S. PATENT DOCUMENTS

2015/0330256 A1* 11/2015 Adachi ................ F01K 7/16
                                                              60/646
2015/0354414 A1    12/2015 Gibble

FOREIGN PATENT DOCUMENTS

JP        H09-088511 A    3/1997
WO        2015/029725 A1  3/2015

OTHER PUBLICATIONS

The extended European search report issued by the European Patent Office dated Aug. 29, 2017, which corresponds to EP17161292.2-1610 and is related to U.S. Appl. No. 15/473,660.

* cited by examiner

*Primary Examiner* — Mark A Laurenzi
*Assistant Examiner* — Mickey H France
(74) *Attorney, Agent, or Firm* — Studebaker & Brackett PC

(57) ABSTRACT

A thermal energy recovery device includes: a circulation line having an evaporator, an expander, a condenser, and a pump; a power recovery machine; a first on-off valve; a thermal energy introduction line configured to introduce a gas phase working medium into a post-expansion space; a second on-off valve; and a control unit. Until an evaporation condition that a liquid phase working medium accumulated in the post-expansion space has reached an amount equal to or smaller than a reference amount is met, the control unit closes the first on-off valve and opens the second on-off valve, and drives the pump in a state where the expander is stopped, and when the evaporation condition is met, the control unit opens the first on-off valve and closes the second on-off valve, and drives the expander.

9 Claims, 7 Drawing Sheets

THERMAL ENERGY RECOVERY DEVICE AND OPERATING METHOD OF THE SAME

BACKGROUND OF THE INVENTION

Field of the Invention

The present invention relates to a thermal energy recovery device.

Description of the Related Art

There has been conventionally known a thermal energy recovery device configured to recover power from exhaust heat discharged from various facilities of a factory or the like. For example, Japanese Unexamined Patent Application Publication No. 09-088511(JP 09-088511A) describes a thermal energy recovery device including a circulation line for circulating a working medium to form a Rankine cycle, and a generator. The circulation line includes an evaporator for evaporating the working medium, a screw turbine for expanding the working medium flowing out of the evaporator, a condenser for condensing the working medium flowing out of the screw turbine, a working medium pump for pumping the working medium flowing out of the condenser to the evaporator, and a flow passage connecting the evaporator, the screw turbine, the condenser, and the working medium pump in series in the mentioned order. The generator is connected to the screw turbine. A heating medium (for example, hot water) for heating the working medium is supplied from an external heat source to the evaporator, and a cooling medium (for example, cooling water) for cooling the working medium is supplied from an external cooling source to the condenser.

SUMMARY OF THE INVENTION

In the thermal energy recovery device described in JP 09-088511A, inadequate lubrication of a bearing of the screw turbine may be caused at the start of operation of the device. Specifically, when the operation of the device is stopped, the working medium existing in a casing of the screw turbine is condensed; therefore, a liquid phase working medium may accumulate in the casing. Accordingly, if the accumulation of such liquid phase working medium causes the bearing of the screw turbine to be immersed in the liquid phase working medium, inadequate lubrication of the bearing may be caused at the time of driving of the screw turbine.

It is thus an object of the present invention to provide a thermal energy recovery device and an operating method of the same that inhibit inadequate lubrication of a bearing at the time of driving of an expander.

A thermal energy recovery device according to an aspect of the present invention is provided in order to achieve the aforementioned object. The thermal energy recovery device includes: a circulation line having an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle; a power recovery machine connected to the expander; a first on-off valve provided at a portion between the evaporator and the expander in the circulation line; a thermal energy introduction line configured to introduce a gas phase working medium flowing out of the evaporator into a post-expansion space within the expander in which the expanded working medium exists; a second on-off valve provided in the thermal energy introduction line; and a control unit, wherein until an evaporation condition that a liquid phase working medium accumulated in the post-expansion space has reached an amount equal to or smaller than a reference amount is met, the control unit closes the first on-off valve and opens the second on-off valve, and drives the pump in a state where the expander is stopped, and when the evaporation condition is met, the control unit opens the first on-off valve and closes the second on-off valve, and drives the expander.

During a warm-up operation of the thermal energy recovery device before the expander is driven (started), the liquid phase working medium existing in the post-expansion space within the expander is heated by the gas phase working medium (hot gas) flowing out of the evaporator, therefore facilitating the evaporation of the liquid phase working medium. Accordingly, when the evaporation condition that the liquid phase working medium accumulated in the post-expansion space has reached an amount equal to or smaller than the reference amount is met, the introduction of the gas phase working medium (hot gas) into the post-expansion space is stopped and the expander is driven. Therefore, inadequate lubrication of a bearing is inhibited at the time of driving of the expander.

A thermal energy recovery device according to another aspect of the present invention is provided. The thermal energy recovery device includes: a circulation line having an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle; a power recovery machine connected to the expander; a first on-off valve provided at a portion between the evaporator and the expander in the circulation line; a thermal energy introduction line configured to introduce a gas phase working medium flowing out of the evaporator into a portion between the expander and the condenser in the circulation line; a second on-off valve provided in the thermal energy introduction line; and a control unit, wherein the expander includes an outlet through which the expanded working medium is discharged, wherein the circulation line includes a rising portion that is formed between the expander and the condenser to have a shape rising upward above the outlet of the expander, wherein a downstream end portion of the thermal energy introduction line is connected to a reservoir that is located in the circulation line at the downstream side of the outlet and at the upstream side of the rising portion, and wherein until an evaporation condition that a liquid phase working medium accumulated in the reservoir has reached an amount equal to or smaller than a reference amount is met, the control unit closes the first on-off valve and opens the second on-off valve, and drives the pump in a state where the expander is stopped, and when the evaporation condition is met, the control unit opens the first on-off valve and closes the second on-off valve, and drives the expander.

Likewise, in the thermal energy recovery device, inadequate lubrication of a bearing is inhibited at the time of driving of the expander. Specifically, after the operation of the thermal energy recovery device is stopped, the liquid phase working medium accumulates in the expander and in the reservoir located between the outlet of the expander and the rising portion in the circulation line, and in the meantime the gas phase working medium (hot gas) flowing out of the evaporator is introduced into the reservoir; therefore, the liquid phase working medium in the reservoir evaporates. As a result, the evaporation of the liquid phase working medium accumulated in the expander located adjacent to the reservoir is facilitated.

According to still another aspect of the present invention, a thermal energy recovery device includes: a circulation line having an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle; a power recovery machine connected to the expander; a first on-off valve provided at a portion between the evaporator and the expander in the circulation line; a thermal energy introduction line configured to introduce a gas phase working medium flowing out of the evaporator into the expander; a second on-off valve provided in the thermal energy introduction line; a working medium returning line configured to return the working medium that is introduced through the thermal energy introduction line into the expander; and a control unit, wherein the expander includes: a casing for housing the working medium; and a jacket provided at the casing to form a thermal medium introduction space between the jacket and the casing, wherein a downstream end portion of the thermal energy introduction line is connected to the jacket so that the gas phase working medium is introduced into the thermal medium introduction space, wherein the working medium returning line connects the jacket with a portion between the expander and the condenser in the circulation line, and wherein until an evaporation condition is met, the control unit closes the first on-off valve and opens the second on-off valve, and drives the pump in a state where the expander is stopped, the evaporation condition indicating that a liquid phase working medium accumulated in a post-expansion space within the casing in which the expanded working medium exists, has reached an amount equal to or smaller than a reference amount, and when the evaporation condition is met, the control unit opens the first on-off valve and closes the second on-off valve, and drives the expander.

Likewise, in the thermal energy recovery device, inadequate lubrication of a bearing is inhibited at the time of driving of the expander. Specifically, during the warm-up operation before the expander is driven (started), the gas phase working medium (hot gas) flowing out of the evaporator is introduced into the thermal medium introduction space; thereby, the casing is heated. Accordingly, the evaporation of the liquid phase working medium accumulated in the post-expansion space within the casing is facilitated. Also, the working medium introduced into the thermal medium introduction space is returned though the working medium returning line to the circulation line. Accordingly, when the evaporation condition that the liquid phase working medium accumulated in the post-expansion space has reached an amount equal to or smaller than the reference amount is met, the introduction of the gas phase working medium (hot gas) into the thermal medium introduction space is stopped and the expander is driven. As a result, inadequate lubrication of the bearing is inhibited at the time of driving of the expander.

According to a further aspect of the present invention, a thermal energy recovery device includes: a circulation line having an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle; a power recovery machine connected to the expander; a thermal energy introduction line configured to introduce the heating medium or a different heating medium from the heating medium into the expander; and a control unit, wherein the expander includes; a casing for housing the working medium; and a jacket provided at the casing to form a thermal medium introduction space between the jacket and the casing, wherein a downstream end portion of the thermal energy introduction line is connected to the jacket so that the heating medium or the different heating medium is introduced into the thermal medium introduction space, and wherein until an evaporation condition is met, the control unit allows an introduction of the heating medium or the different heating medium into the thermal medium introduction space in a state where the expander and the pump are stopped, the evaporation condition indicating that liquid phase working medium accumulated in a post-expansion space within the casing in which the expanded working medium exists, has reached an amount equal to or smaller than a reference amount, and when the evaporation condition is met, the control unit stops the introduction of the heating medium or the different heating medium into the thermal medium introduction space and drives the expander and the pump.

Likewise, in the thermal energy recovery device, inadequate lubrication of a bearing is inhibited at the time of driving of the expander. Specifically, during the warm-up operation before the expander is driven (started), the heating medium or the different heating medium is introduced into the thermal medium introduction space; thereby, the casing is heated. Thus, the evaporation of the liquid phase working medium accumulated in the post-expansion space within the casing is facilitated. Accordingly, when the evaporation condition that the liquid phase working medium accumulated in the post-expansion space has reached an amount equal to or smaller than the reference amount is met, the introduction of the heating medium or the different heating medium into the thermal medium introduction space is stopped and the expander and the pump are driven. Therefore, inadequate lubrication of the bearing is inhibited at the time of driving of the expander.

Also, in the thermal energy recovery device, when a predetermined time has passed after the pump is driven or when a predetermined time has passed after the introduction of the heating medium or the different heating medium into the thermal medium introduction space, the control unit may determine that the evaporation condition is met.

Also, in the thermal energy recovery device, when the degree of superheat of the working medium in the post-expansion space within the expander in which the expanded working medium exists has reached a predetermined value or higher, the control unit may determine that the evaporation condition is met.

With such a configuration, inadequate lubrication of a bearing of the expander is surely inhibited at the time of driving of the expander (at the start of a steady operation).

Also, the thermal energy recovery device may further include a liquid level sensor that detects a liquid level of the liquid phase working medium within the expander. When a value detected by the liquid level sensor has reached a value equal to or lower than a specified value, the control unit may determine that the evaporation condition is met.

With such a configuration, the liquid level sensor may be arranged, for example, below the bearing of the expander; in such a case, the operation of the expander (the steady operation) is started before the whole amount of the liquid phase working medium accumulated in the post-expansion space evaporates. As a result, inadequate lubrication of the bearing of the expander is inhibited at the time of driving of the expander, and in addition, the warm-up operation time can be reduced.

A method of operating a thermal energy recovery device according to another aspect of the present invention is provided. The thermal energy recovery device includes: a circulation line having an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle; and a power recovery machine connected to the expander. The operating method includes: an evaporation step of, in a state where the expander is stopped, supplying thermal energy of the heating medium directly via the heating medium or indirectly via the working medium to a liquid phase working medium accumulated in a post-expansion space within the expander in which the expanded working medium exists, and thereby evaporating at least a portion of the liquid phase working medium; and an expander driving step of, when an evaporation condition that the liquid phase working medium accumulated in the post-expansion space has reached an amount equal to or smaller than a reference amount is met, stopping a supply of the thermal energy to the liquid phase working medium and driving the expander.

According to the operating method, in the evaporation step before the expander driving step, at least a portion of the liquid phase working medium accumulated in the post-expansion space is evaporated by the thermal energy of the heating medium; therefore, inadequate lubrication of a bearing of the expander is inhibited in the expander driving step.

As described above, the present invention can provide a thermal energy recovery device and an operating method of the same that inhibit inadequate lubrication of a bearing at the time of driving of an expander.

DESCRIPTION OF THE PREFERRED EMBODIMENTS

Hereinafter, embodiments for practicing the present invention will be described in detail with reference to the drawings.

First Embodiment

Figure 1:
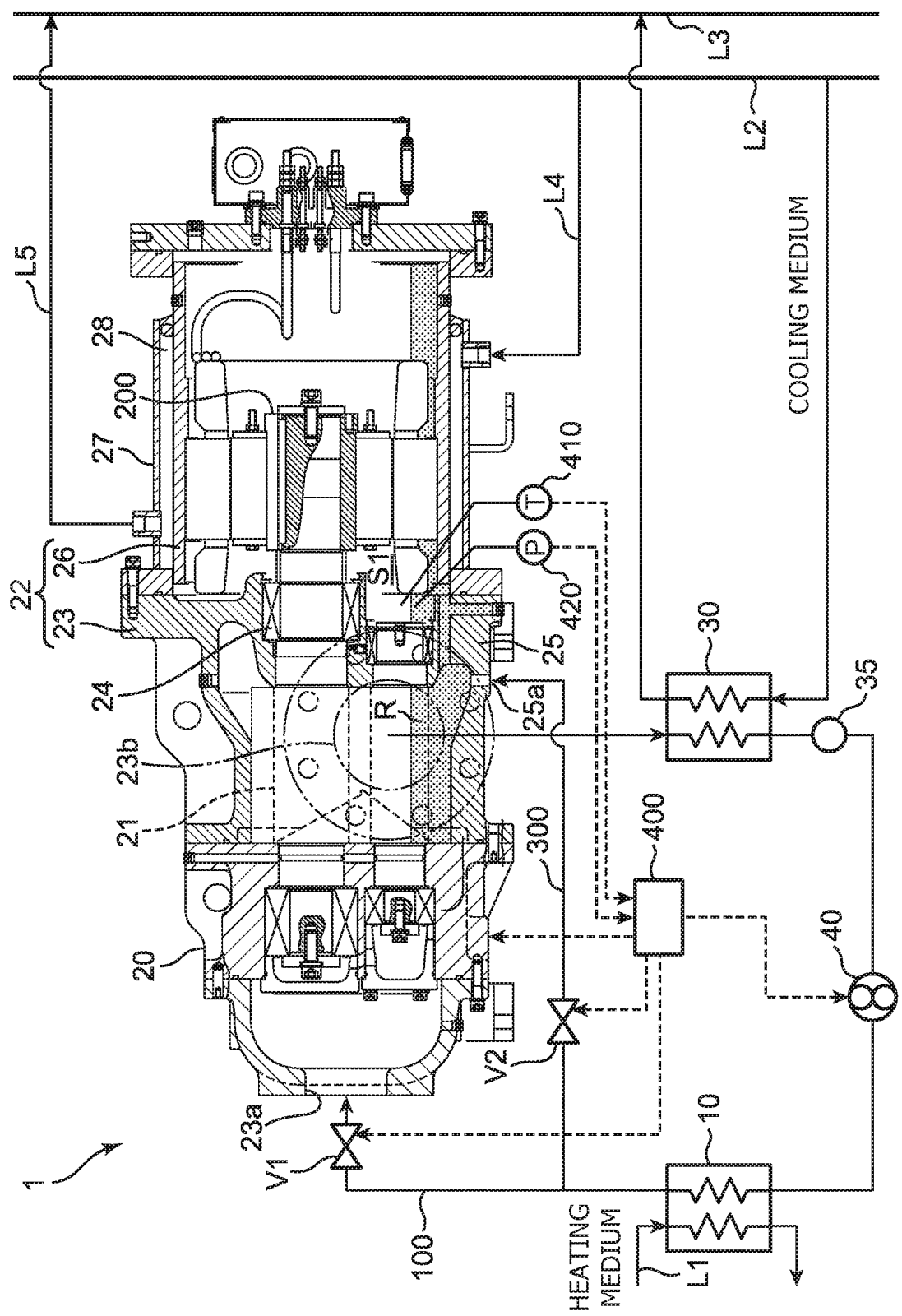
FIG. 1 is a schematic view showing the configuration of a thermal energy recovery device according to a first embodiment of the present invention.

FIG. 1 shows the configuration of a thermal energy recovery device 1 according to a first embodiment of the present invention. The thermal energy recovery device 1 is equipped with a circulation line 100, a power recovery machine 200, a first on-off valve V1, a thermal energy introduction line 300, a second on-off valve V2, and a control unit 400.

The circulation line 100 is configured to circulate a working medium to form a Rankine cycle. Specifically, the circulation line 100 includes an evaporator 10, an expander 20, a condenser 30, and a pump 40. The circulation line 100 includes a pipe (flow passage) in which the evaporator 10, the expander 20, the condenser 30, and the pump 40 are connected in series in the mentioned order.

The evaporator 10 is configured to allow the working medium to be thermally exchanged with a heating medium (for example, hot water), thereby evaporating the working medium. The heating medium is supplied from a heat source through a heating medium supply line L1 to the evaporator 10.

The expander 20 is provided at a downstream portion of the evaporator 10 in the circulation line 100. The expander 20 is configured to expand a gas phase working medium (hot gas) flowing out of the evaporator 10. In the first embodiment, a positive displacement screw expander is used as the expander 20. The screw expander includes a rotor rotationally driven by expansion energy of the gas phase working medium. Specifically, the expander 20 includes a pair of male and female screw rotors 21, a casing 22 that houses the screw rotors 21, and a bearing 24 that supports respective shafts of the screw rotors 21.

The power recovery machine 200 is connected to one of the shafts of the pair of screw rotors 21. In the first embodiment, a generator including a rotating shaft connected to the one of the shafts is used as the power recovery machine 200. The power recovery machine 200 is configured to generate electric power by rotation of the rotating shaft in accordance with rotation of the screw rotors 21. Also, for example, a compressor may be used as the power recovery machine 200.

The casing 22 includes a main case 23 that houses the pair of screw rotors 21 and a sub-case 26 that houses the power recovery machine 200.

The main case 23 includes an inlet 23a from which the gas phase working medium flowing out of the evaporator 10 is suctioned, and an outlet 23b from which the working medium after expansion thereof in the screw rotors 21 is discharged. In the first embodiment, the main case 23 is arranged such that the outlet 23b is horizontally oriented. The bearing 24 is held in the main case 23.

The sub-case 26 is coupled to the main case 23. The inside of the sub-case 26 is communicated with the inside of the main case 23. Therefore, the working medium that has expanded in the main case 23 also exists in the sub-case 26. In other words, a space within the main case 23 in which the working medium after expansion thereof in the screw rotors 21 exists and a space within the sub-case 26 configure "a post-expansion space S1" in the expander 20 within which the expanded working medium exists.

The casing 22 of the first embodiment includes a jacket 27 that surrounds the sub-case 26. The jacket 27 is provided at the sub-case 26 such that a thermal medium introduction space 28 is formed between the jacket 27 and the sub-case 26. A cooling medium (for example, cooling water) for cooling a motor of the power recovery machine 200 is supplied through a cooling medium supply line L4 branched from a cooling medium supply header L2, into the thermal medium introduction space 28. The cooling medium flows through the thermal medium introduction space 28, thereby cooling the sub-case 26 and the motor of the power recovery machine 200. Afterward, the cooling medium flows through a cooling medium discharge line L5 into a cooling medium discharge header L3.

The condenser 30 is provided at a downstream portion of the expander 20 in the circulation line 100. The condenser 30 is configured to allow the gas phase working medium flowing out of the expander 20 to be thermally exchanged with the cooling medium (for example, cooling water), thereby condensing the working medium. The cooling medium is supplied from a cooling source through the cooling medium supply header L2 to the condenser 30.

In the first embodiment, a storage (receiver) 35 for storing a liquid phase working medium is provided at a downstream portion of the condenser 30 in the circulation line 100. The storage 35 may be configured by a portion of the pipe of the circulation line 100.

The pump 40 is provided at a downstream portion of the condenser 30 in the circulation line 100 (at a portion located between the condenser 30 and the evaporator 10). The pump 40 is configured to pressurize the liquid phase working medium flowing out of the condenser 30 to a predetermined pressure level and subsequently pump the working medium to the evaporator 10.

The first on-off valve V1 is provided at a portion between the evaporator 10 and the expander 20 in the circulation line 100. The gas phase working medium flowing out of the evaporator 10 is regulated by the first on-off valve V1 to flow into the expander 20 or to be shut off with respect to the expander 20.

The thermal energy introduction line 300 is configured to introduce the gas phase working medium (hot gas) flowing out of the evaporator 10 into the expander 20. As shown in FIG. 1, in the first embodiment, the thermal energy introduction line 300 is connected to an introduction port 25a formed in a bottom wall 25 of the main case 23. The introduction port 25a is in communication with the post-expansion space S1. In other words, in the first embodiment, the gas phase working medium is introduced through the thermal energy introduction line 300 into the post-expansion space S1.

The second on-off valve V2 is provided in the thermal energy introduction line 300. The gas phase working medium (hot gas) flowing of the evaporator 10 is regulated by the second on-off valve V2 to flow into the post-expansion space S1 or to be shut off with respect to the post-expansion space S1.

The control unit 400 is configured to when the expander 20 is driven (started), control the opening and closing of each of the valves, the start and stop of the pump 40, the start and stop of the expander 20, and other operations. A liquid phase working medium R (see FIG. 1) may be accumulated in the expander 20 (in the casing 22) at the time of driving of the expander 20. Therefore, the control unit 400 allows an introduction of thermal energy through the thermal energy introduction line 300 into the expander 20 until an evaporation condition is met. The evaporation condition indicates that an accumulated amount of the liquid phase working medium R in the casing 22 is equal to or smaller than a reference amount. In addition, when the evaporation condition is met, the control unit 400 stops the introduction of thermal energy into the expander 20 and drives the expander 20 (the thermal energy recovery device 1 shifts to a steady operation).

Specifically, in a state where the expander 20 is stopped, the control unit 400 closes the first on-off valve V1 and opens the second on-off valve V2, and drives the pump 40. Accordingly, the gas phase working medium (hot gas) flowing out of the evaporator 10 is introduced through the thermal energy introduction line 300 into the post-expansion space S1 of the expander 20. In other words, thermal energy of the heating medium is supplied via the working medium to the expander 20. Therefore, the liquid phase working medium R accumulated in the casing 22 is heated by the gas phase working medium and thereby evaporates.

Thereafter, when determining that the evaporation condition is met (a warm-up operation of the thermal energy recovery device has finished), the control unit 400 opens the first on-off valve V1 and closes the second on-off valve V2, and drives the expander 20 and the power recovery machine 200. Therefore, the thermal energy recovery device 1 shifts to a steady operation.

In the first embodiment, when the degree of superheat of the working medium in the post-expansion space S1 within the casing 22 has reached a predetermined value or higher, the control unit 400 determines that the evaporation condition is met. In other words, when the aforementioned degree of superheat has reached the predetermined value or higher, the control unit 400 opens the first on-off valve V1 and closes the second on-off valve V2, and drives the expander 20 and the power recovery machine 200. The degree of superheat is calculated based on a value detected by a temperature sensor 410 that detects the temperature of the working medium in the post-expansion space S1 and on a value detected by a pressure sensor 420 that detects the pressure of the working medium in the post-expansion space S1.

As described above, in the thermal energy recovery device 1 of the first embodiment, during the warm-up operation before the expander 20 is driven (started), the liquid phase working medium R existing in the post-expansion space S1 within the expander 20 is heated by the gas phase working medium (hot gas) flowing out of the evaporator 10. Therefore, the evaporation of the liquid phase working medium R is facilitated. Accordingly, when the evaporation condition that the accumulated amount of the liquid phase working medium R in the post-expansion space S1 has reached a level equal to or smaller than the reference amount is met, the introduction of the gas phase working medium (hot gas) into the post-expansion space S1 is stopped and the expander 20 is driven. As a result, inadequate lubrication of the bearing 24 is inhibited at the time of driving of the expander 20 (at the time of start-up of the Rankine cycle).

Further, in the first embodiment, when the degree of superheat of the working medium in the post-expansion space S1 has reached the predetermined value or higher, the control unit 400 determines that the aforementioned evaporation condition is met. With such a configuration, inadequate lubrication of the bearing 24 of the expander 20 is surely inhibited at the time of driving of the expander 20 (at the start of the steady operation).

Figure 2:
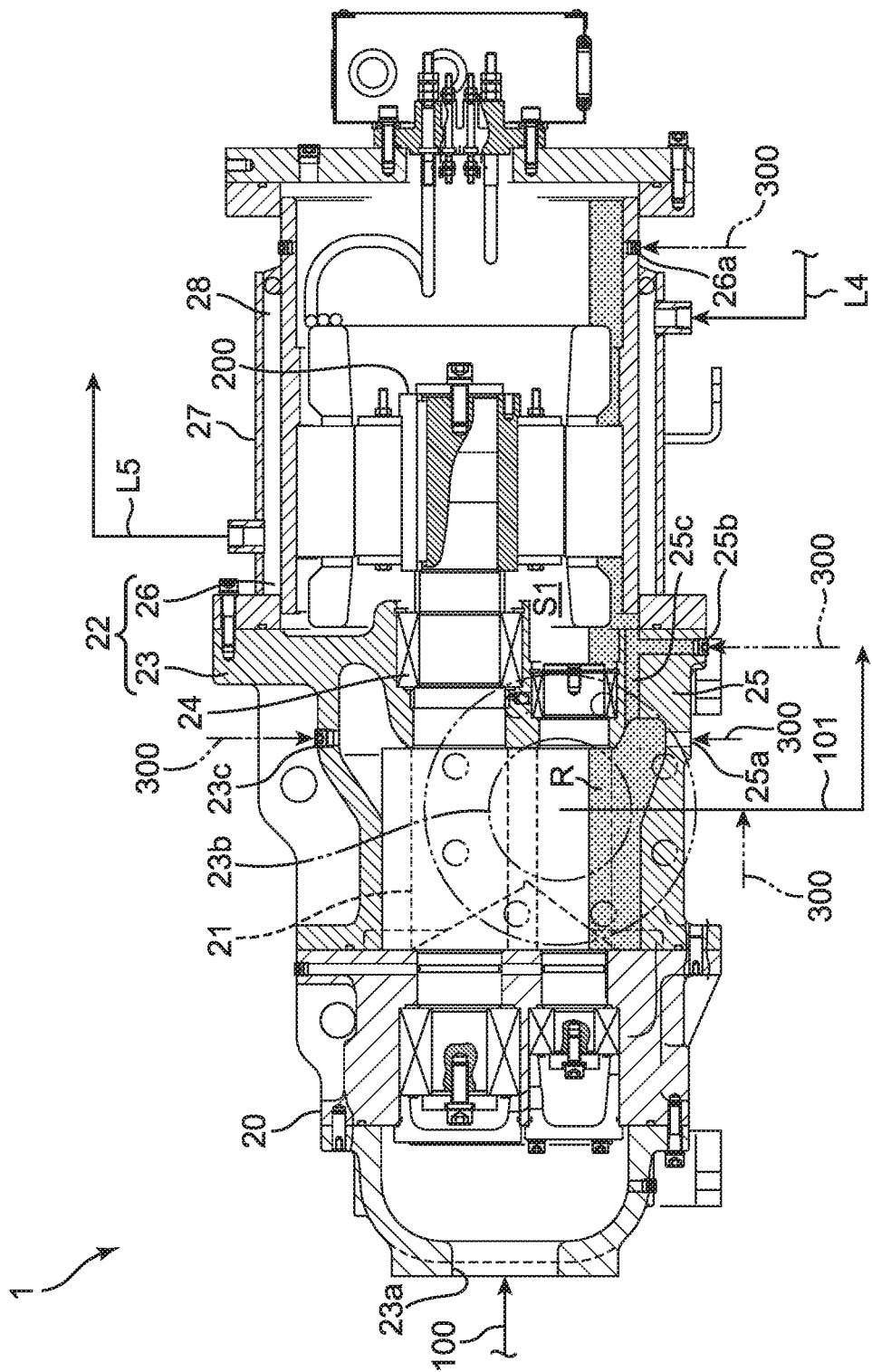
FIG. 2 is a drawing showing examples of a connection destination of a downstream end portion of a thermal energy introduction line.

An example where a downstream end portion of the thermal energy introduction line 300 is connected to the introduction port 25*a* of the bottom wall 25 is provided in the first embodiment. Alternatively, as shown in FIG. 2, the downstream end portion may be connected to an introduction port 26*a* provided in a lower portion of the sub-case 26 or to an introduction port 23*c* provided in an upper wall of the main case 23 to be communicated with the post-expansion space S1.

Also, the downstream end portion may be connected to an introduction port 25*b* that is formed in the bottom wall 25 of the main case 23 so as to connect to a communication path 25*c* allowing communication between the main case 23 and the sub-case 26.

Figure 3:
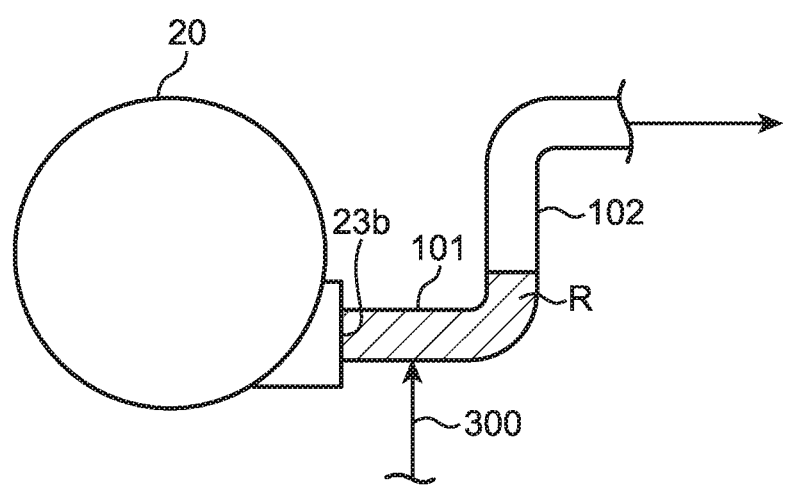
FIG. 3 is a drawing illustrating an example in which the downstream end portion of the thermal energy introduction line is connected to a portion between an outlet and a rising portion in a circulation line.

Alternatively, the downstream end portion may be connected to a discharge pipe 101 in the pipe of the circulation line 100, which is located downstream of the outlet 23*b*. In this case, as shown in FIG. 3, the downstream end portion is connected to a portion (reservoir) in the pipe of the circulation line 101, which is located between the outlet 23*b* and a rising portion 102 that has a shape rising upward above the outlet 23*b*. Even with such a configuration, inadequate lubrication of the bearing 24 is inhibited at the time of driving of the expander 20. Specifically, after the operation of the thermal energy recovery device is stopped, the liquid phase working medium R accumulates in the expander 20 and the reservoir, and in the meantime the gas phase working medium (hot gas) flowing out of the evaporator 10 is introduced into the reservoir. Accordingly, the liquid phase working medium in the reservoir evaporates. Therefore, the evaporation of the liquid phase working medium R accumulated in the expander 20 provided adjacent to the reservoir is facilitated.

Second Embodiment

Figure 4:
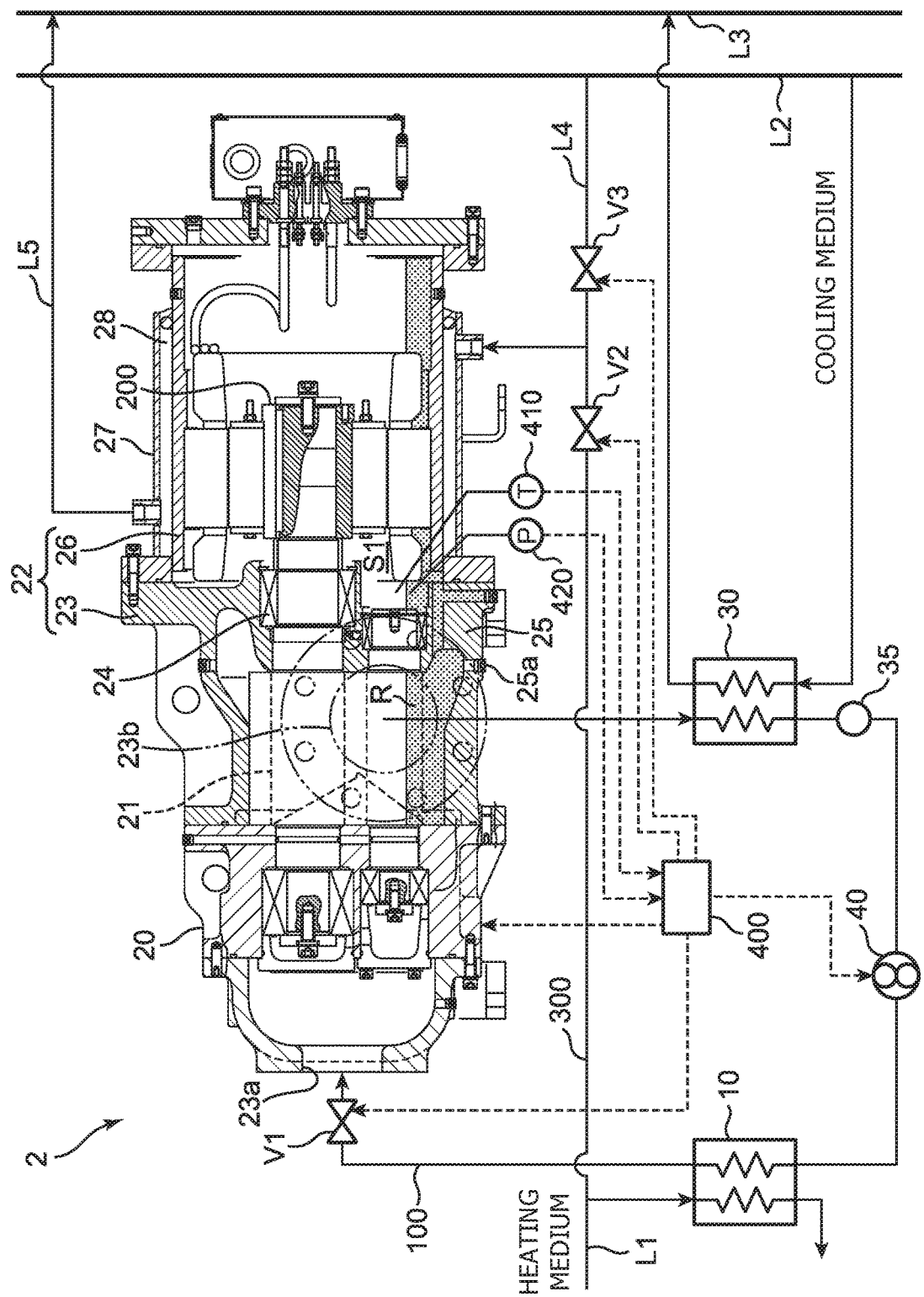
FIG. 4 is a schematic view showing the configuration of a thermal energy recovery device according to a second embodiment of the present invention.

Next, a thermal energy recovery device 2 according to a second embodiment of the present invention will be described with reference to FIG. 4. In the second embodiment, only differences from the first embodiment will be described, and configurations, functions, and effects that are the same as those of the first embodiment will not be described.

The second embodiment is different from the first embodiment in that not the gas phase working medium (hot gas) flowing out of the evaporator 10 but a heating medium is directly introduced into the expander 20. In other words, the second embodiment is different from the first embodiment in that thermal energy of the heating medium is supplied not indirectly via the working medium, but directly via the heating medium to the expander 20. Specifically, the thermal energy introduction line 300 is branched from the heating medium supply line L1 to be connected via the second on-off valve V2 to the jacket 27. A third on-off valve V3 is provided in the cooling medium supply line L4 through which a cooling medium is supplied to the jacket 27.

In the second embodiment, until the evaporation condition is met, the control unit 400 allows an introduction of the heating medium into the thermal medium introduction space 28 in a state where the expander 20 and the pump 40 are stopped. In addition, when the evaporation condition is met, the control unit 400 stops the introduction of the heating medium into the thermal medium introduction space 28 and drives the expander 20 and the pump 40. Specifically, in a state where the expander 20 and the pump 40 are stopped, the control unit 400 closes the first on-off valve V1, opens the second on-off valve V2, and closes the third on-off valve V3. Therefore, the heating medium is introduced through the thermal energy introduction line 300 into the thermal medium introduction space 28. Consequently, the liquid phase working medium R accumulated in the post-expansion space S1 evaporates. The heating medium passes through the thermal medium introduction space 28 to heat the liquid phase working medium R, thereafter flowing through the cooling medium discharge line L5 into the cooling medium discharge header L3.

Afterward, when determining that the evaporation condition is met (the warm-up operation has finished), the control unit 400 opens the first on-off valve V1, closes the second on-off valve V2, and opens the third on-off valve V3, and in addition, drives the expander 20 and the pump 40. Therefore, the thermal energy recovery device 2 shifts to a steady operation.

As described above, also in the second embodiment, inadequate lubrication of the bearing 24 is inhibited at the time of driving of the expander 20.

Further, in the second embodiment, instead of the second on-off valve V2 and the third on-off valve V3, a three-way valve may be provided at the intersection of the thermal energy introduction line 300 and the cooling medium supply line L4. Also, another heating medium different from the heating medium to be supplied to the evaporator 10 may be supplied to the thermal medium introduction space 28.

Furthermore, in the second embodiment, the gas phase working medium (hot gas) may be supplied to the post-expansion space S1 as in the first embodiment.

Third Embodiment

Figure 5:
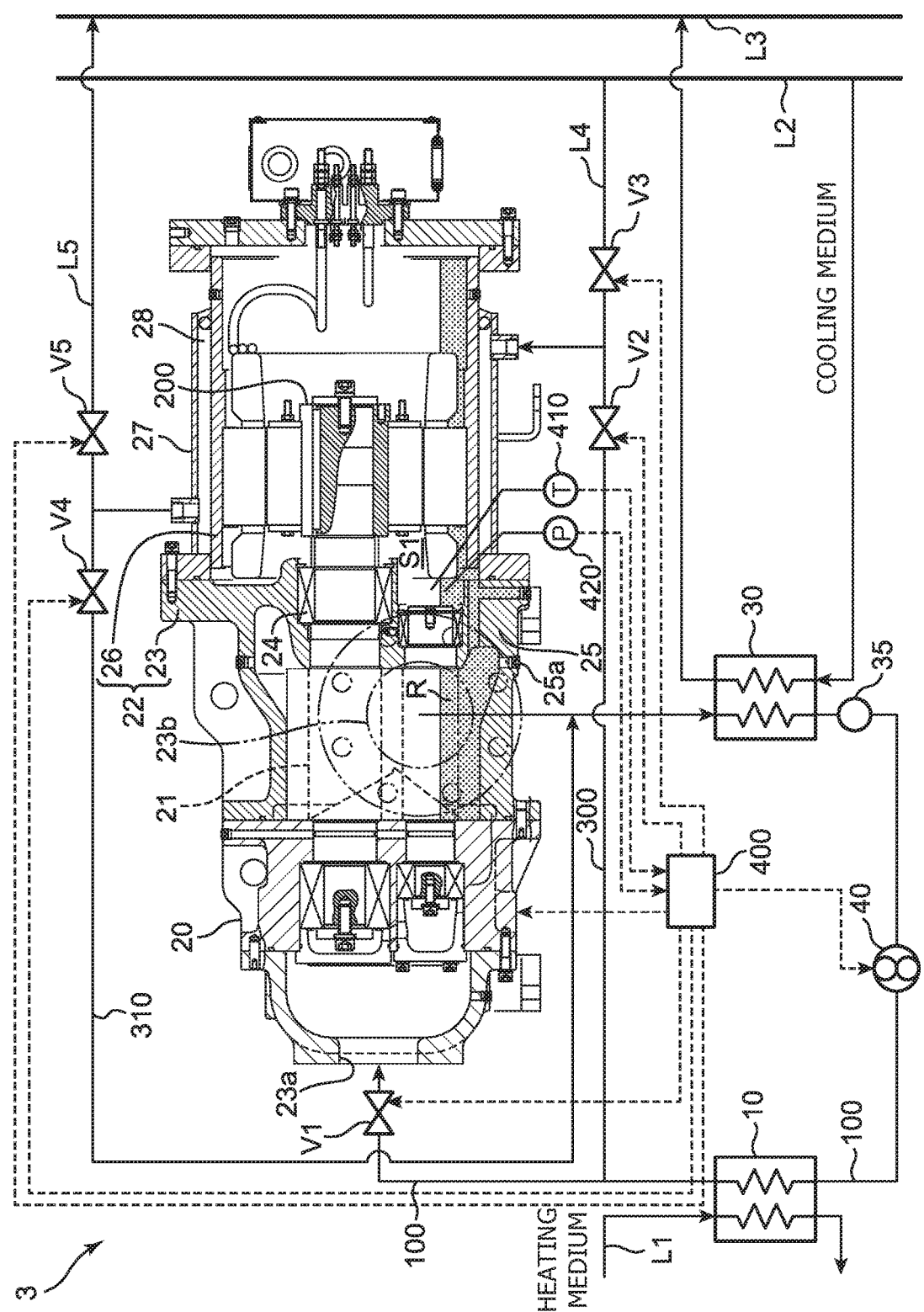
FIG. 5 is a schematic view showing the configuration of a thermal energy recovery device according to a third embodiment of the present invention.

Next, a thermal energy recovery device 3 according to a third embodiment of the present invention will be described with reference to FIG. 5. In the third embodiment, only differences from the second embodiment will be described, and configurations, functions, and effects that are the same as those of the second embodiment will not be described.

The third embodiment is different from the second embodiment in that not a heating medium but the gas phase working medium (hot gas) flowing out of the evaporator 10 is introduced into the thermal medium introduction space 28. Specifically, the thermal energy introduction line 300 is branched from a portion between the evaporator 10 and the expander 20 in the circulation line 100 to be connected to the jacket 27. The thermal energy recovery device 3 further includes a working medium returning line 310. The working medium passes through the thermal medium introduction space 28 to heat the liquid phase working medium R accumulated in the post-expansion space 51, thereafter being returned through the working medium returning line 310. An upstream end portion of the working medium returning line 310 is connected to the jacket 27 while a downstream end portion of the working medium returning line 310 is connected to a portion between the expander 20 and the condenser 30 in the circulation line 100. A fourth on-off valve V4 is provided in the working medium returning line 310. A fifth on-off valve V5 is provided in the cooling medium discharge line L5.

In the third embodiment, until the evaporation condition is met, the control unit 400 allows an introduction of the gas phase working medium (hot gas) flowing out of the evaporator 10 into the thermal medium introduction space 28 in a state where the expander 20 is stopped. In addition, when the evaporation condition is met, the control unit 400 stops the introduction of the gas phase working medium into the thermal medium introduction space 28 and drives the expander 20. Specifically, in a state where the expander 20 is stopped, the control unit 400 closes the first on-off valve V1, opens the second on-off valve V2, closes the third on-off valve V3, opens the fourth on-off valve V4, and closes the fifth on-off valve V5. Therefore, the gas phase working medium (hot gas) is introduced through the thermal energy introduction line 300 into the thermal medium introduction space 28. Consequently, the liquid phase working medium R accumulated in the post-expansion space S1 evaporates. In addition, the gas phase working medium introduced into the thermal medium introduction space 28 is returned through the working medium returning line 310 to the circulation line 100.

Afterward, when determining that the evaporation condition is met (the warm-up operation has finished), the control unit 400 opens the first on-off valve V1, closes the second on-off valve V2, opens the third on-off valve V3, closes the fourth on-off valve V4, and opens the fifth on-off valve V5, and in addition, drives the expander 20. Therefore, the thermal energy recovery device 3 shifts to a steady operation.

As described above, also in the third embodiment, inadequate lubrication of the bearing 24 is inhibited at the time of driving of the expander 20.

Further, in the third embodiment in the same way as the foregoing second embodiment, instead of the second on-off valve V2 and the third on-off valve V3, a three-way valve may be provided at the intersection of the thermal energy introduction line 300 and the cooling medium supply line L4. Also, instead of the fourth on-off valve V4 and the fifth on-off valve V5, a three-way valve may be provided at the intersection of the working medium returning line 310 and the cooling medium discharge line L5.

The embodiments described here are to be considered in all respects as illustrative and as non-restrictive. The scope of the present invention is indicated not by the descriptions of the foregoing embodiments but by the claims, and the scope of the present invention may include all changes within the meaning and scope equivalent to the claims.

For example, in the foregoing first embodiment, when a predetermined period of time has passed after driving the pump 40 or opening the second on-off valve V2, the control unit 400 may determine that the evaporation condition is met. In this case, the temperature sensor 410 and the pressure sensor 420 may be omitted. The predetermined period of time is the time until the liquid level of the liquid phase working medium R accumulated in the post-expansion space S1 has reached a level lower than the bearing 24, in other words, the predetermined period of time is the time until the liquid level has reached a level lower than the lowest portion of the plane of motion of the bearing 24 located in the post-expansion space S1. In addition, the predetermined period of time is the time that is preliminarily obtained from test runs performed under various conditions such as outside temperatures and the time after stopping the expander 20. Further, in the foregoing second embodiment, when a predetermined period of time has passed after opening the second on-off valve V2, the control unit 400 may determine that the evaporation condition is met. In the second embodiment, instead of the second on-off valve V2 and the third on-off valve V3, a three-way valve may be provided at the intersection of the thermal energy introduction line 300 and the cooling medium supply line L4. In such a case, when a predetermined period of time has passed after the opening and closing operation of the three-way valve is performed so that the heating medium is supplied to the jacket 27, the control unit 400 may determine that the evaporation condition is met. Furthermore, in the foregoing third embodiment, when a predetermined period of time has passed after driving the pump 40 or opening the second on-off valve V2, the control unit 400 may determine that the evaporation condition is met. Also, in the third embodiment in the same way as the foregoing second embodiment, the control unit 400 may determine whether the evaporation condition is met, based on the opening and closing operation of the three-way valve.

Also, the control unit 400 may determine whether the evaporation condition is met, based on a value detected by a liquid level sensor that detects the liquid level of the liquid phase working medium R in the post-expansion space S1. Specifically, the control unit 400 determines that the evaporation condition is met when the liquid level of the liquid phase working medium R is detected by the liquid level sensor as being situated at a level lower than the bearing 24, in other words, when the liquid level is detected as being situated at a level lower than the lowest portion of the plane of motion of the bearing 24 located in the post-expansion space S1. A condition that the liquid level has reached a level lower than the lowest portion of the plane of motion of the bearing 24 located in the post-expansion space S1 is applied as the evaporation condition that the liquid phase working medium R accumulated in the post-expansion space S1 has reached an amount equal to or lower than the reference amount; thereby, the operation of the expander 20 (the steady operation) is started before the whole amount of the liquid phase working medium R accumulated in the post-expansion space S1 evaporates. As a result, inadequate lubrication of the bearing 24 of the expander 20 is inhibited at the time of driving of the expander 20, and in addition, the warm-up operation time can be reduced. For example, the liquid level sensor may be an optical, float, or capacitance type liquid level sensor. Alternatively, a sensor for detecting the liquid level based on a difference between electrical resistivity (volume resistivity) of the gas phase working medium and electrical resistivity (volume resistivity) of the liquid phase working medium may be applied as the liquid level sensor.

Figure 6:
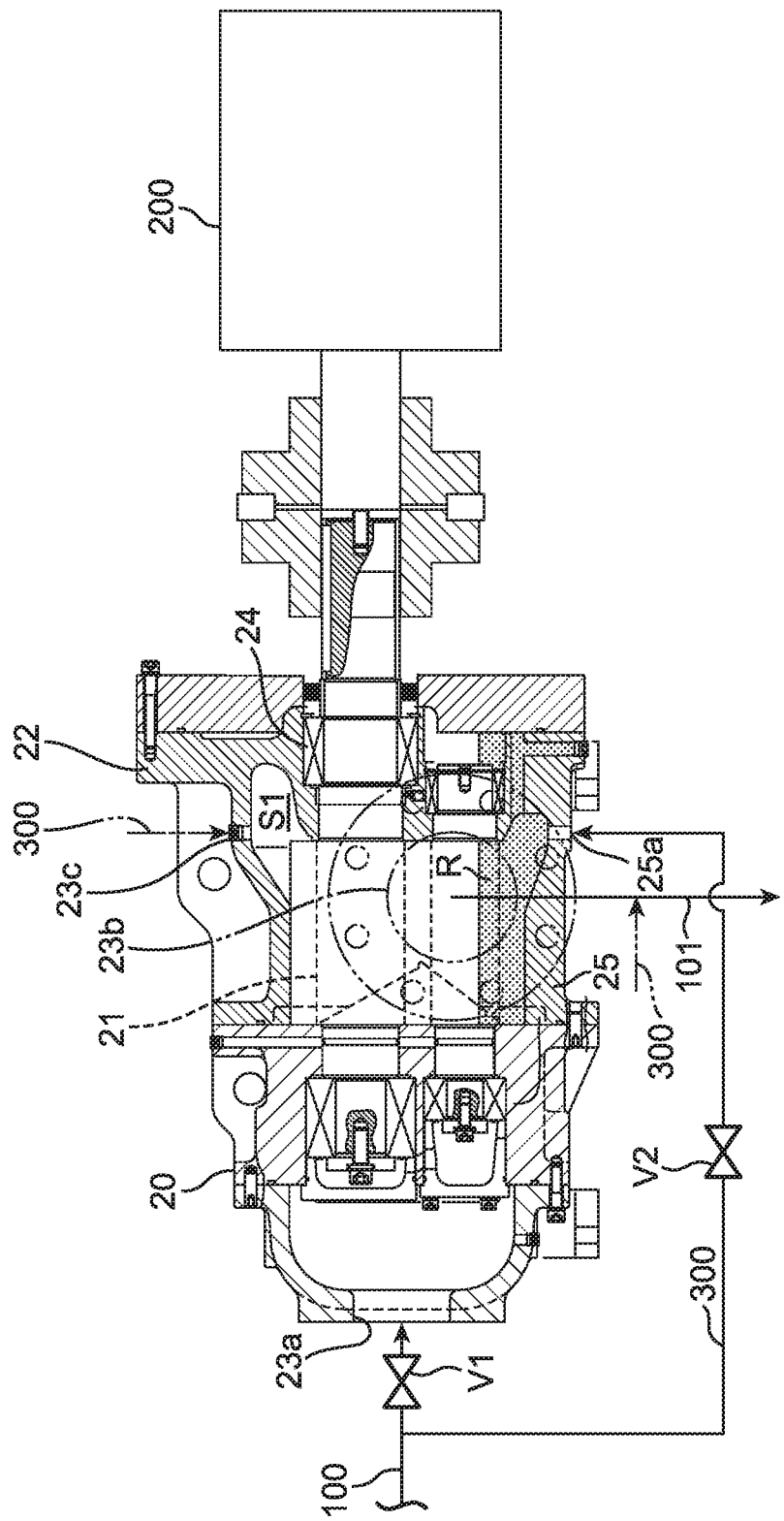
FIG. 6 is a view showing a modified example of an expander and a power recovery machine.

Further, in the foregoing embodiments, an expander (a so-called open expander separated from a motor) not including the sub-case 26 as shown in FIG. 6 may be applied as the expander 20. Also in this case, as shown in FIG. 6, the downstream end portion of the thermal energy introduction line 300 may be connected to the introduction port 23c or the discharge pipe 101 (reservoir).

Figure 7:
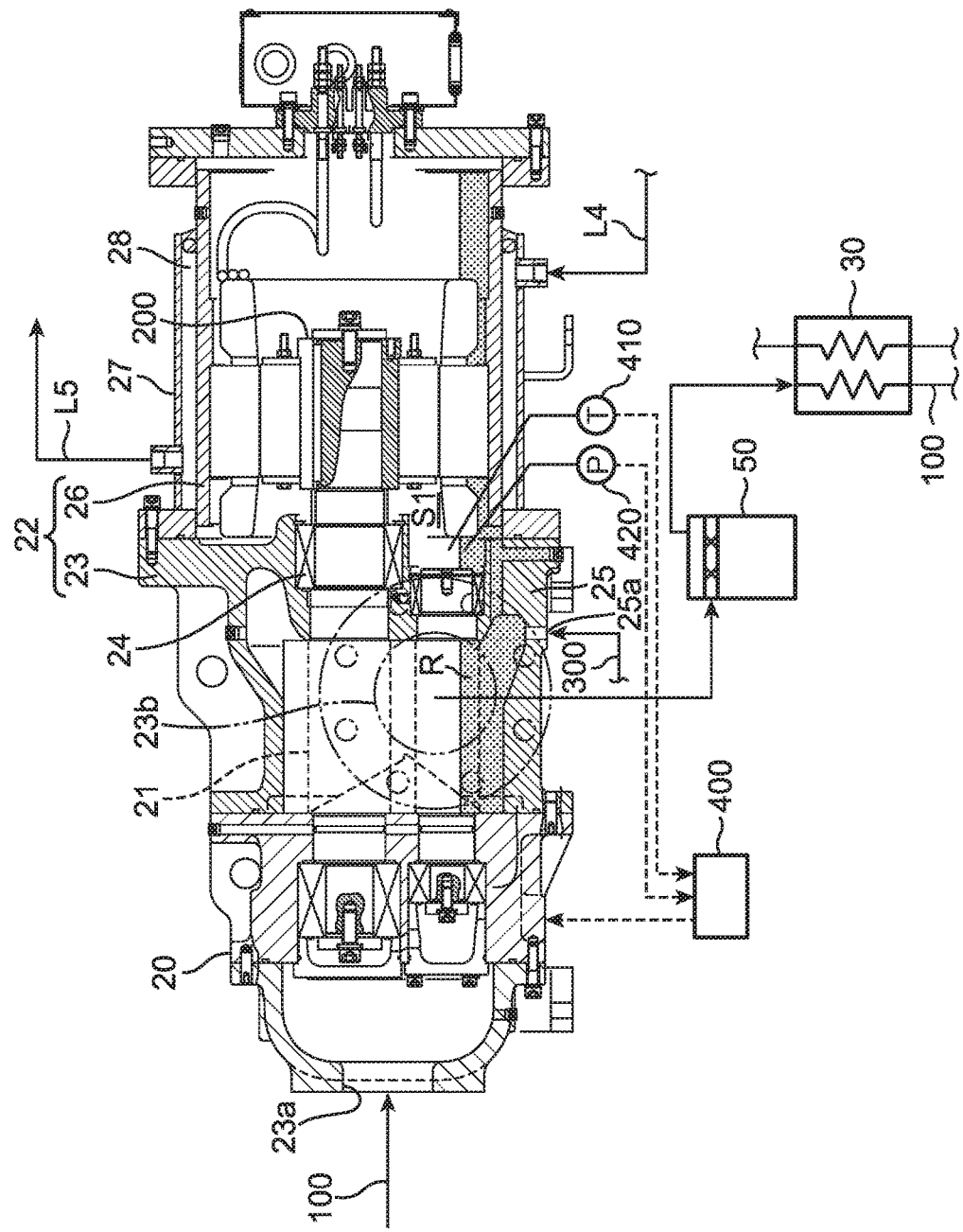
FIG. 7 is a view illustrating an example in which an oil separator is provided between the expander and a condenser in the circulation line.

Furthermore, as shown in FIG. 7, an oil separator 50 may be provided at a portion between the expander 20 and the condenser 30 in the circulation line 100. In this case, if the downstream end portion of the thermal energy introduction line 300 is connected to the oil separator 50 and thereby the liquid phase working medium R accumulated in the post-expansion space S1 can be heated, the downstream end portion may be connected to the oil separator 50. Accordingly, the liquid phase working medium accumulated in the oil separator 50 evaporates during the warm-up operation; thereby, separation of oil from the working medium is facilitated. As a result, when the thermal energy recovery device shifts to the steady operation, inadequate lubrication of the bearing 24 is further surely inhibited.

Also, the thermal energy introduction line 300 may be provided with plural downstream end portions, each of which is branched from an intermediate portion of the thermal energy introduction line 300. In this case, the respective downstream end portions may be connected to different introduction ports. With such a configuration, the liquid phase working medium R accumulated in plural locations within the post-expansion space Si can be effectively heated, thereby further reducing the warm-up operation time.

Also, an upstream end portion of the thermal energy introduction line 300 is not limited to a branch of the circulation line 100, which extends from a portion thereof between the evaporator 10 and the expander 20. Alternatively, the upstream end portion may be a branch of the circulation line 100, which extends from a portion thereof above the evaporator 10.

Furthermore, the sub-case 26 and the jacket 27 that form the thermal medium introduction space 28 may be different members from each other or may be a member integrally molded by casting.

What is claimed is:

1. A thermal energy recovery device comprising:
a circulation line including an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle;
a power recovery machine connected to the expander;
a first on-off valve provided at a portion between the evaporator and the expander in the circulation line;
a thermal energy introduction line configured to introduce a gas phase working medium flowing out of the evaporator into a post-expansion space within the expander in which the expanded working medium exists;
a second on-off valve provided in the thermal energy introduction line; and
a control unit,
wherein until an evaporation condition that a liquid phase working medium accumulated in the post-expansion space has reached an amount equal to or smaller than a reference amount is met, the control unit closes the first on-off valve and opens the second on-off valve, and drives the pump in a state where the expander is stopped, and when the evaporation condition is met, the control unit opens the first on-off valve and closes the second on-off valve, and drives the expander.

2. A thermal energy recovery device comprising:
a circulation line including an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle;
a power recovery machine connected to the expander;
a first on-off valve provided at a portion between the evaporator and the expander in the circulation line;
a thermal energy introduction line configured to introduce a gas phase working medium flowing out of the evaporator into a portion between the expander and the condenser in the circulation line;
a second on-off valve provided in the thermal energy introduction line; and
a control unit,
wherein the expander includes an outlet through which the expanded working medium is discharged,
wherein the circulation line includes a rising portion that is formed between the expander and the condenser to have a shape rising upward above the outlet of the expander,
wherein a downstream end portion of the thermal energy introduction line is connected to a reservoir that is located in the circulation line at the downstream side of the outlet and at the upstream side of the rising portion, and
wherein until an evaporation condition that a liquid phase working medium accumulated in the reservoir has reached an amount equal to or smaller than a reference amount is met, the control unit closes the first on-off valve and opens the second on-off valve, and drives the pump in a state where the expander is stopped, and when the evaporation condition is met, the control unit opens the first on-off valve and closes the second on-off valve, and drives the expander.

3. The thermal energy recovery device according to claim 1, wherein when a predetermined time has passed after the pump is driven, the control unit determines that the evaporation condition is met.

4. The thermal energy recovery device according to claim 2, wherein when a predetermined time has passed after the pump is driven, the control unit determines that the evaporation condition is met.

5. The thermal energy recovery device according to claim 1, wherein when the degree of superheat of the working medium in the post-expansion space within the expander in which the expanded working medium exists has reached a predetermined value or higher, the control unit determines that the evaporation condition is met.

6. The thermal energy recovery device according to claim 2, wherein when the degree of superheat of the working medium in the post-expansion space within the expander in which the expanded working medium exists has reached a predetermined value or higher, the control unit determines that the evaporation condition is met.

7. The thermal energy recovery device according to claim 1, further comprising a liquid level sensor that detects a liquid level of the liquid phase working medium within the expander,
wherein when a value detected by the liquid level sensor has reached a value equal to or lower than a specified value, the control unit determines that the evaporation condition is met.

8. The thermal energy recovery device according to claim 2, further comprising a liquid level sensor that detects a liquid level of the liquid phase working medium within the expander,
wherein when a value detected by the liquid level sensor has reached a value equal to or lower than a specified value, the control unit determines that the evaporation condition is met.

9. A method of operating a thermal energy recovery device,
the thermal energy recovery device comprising:
a circulation line including an evaporator configured to allow a heating medium and a working medium to be thermally exchanged with each other to evaporate the working medium, an expander configured to expand the working medium flowing out of the evaporator, a condenser configured to condense the working medium flowing out of the expander, and a pump configured to pump the working medium flowing out of the condenser to the evaporator, the circulation line being configured to circulate the working medium through the evaporator, the expander, the condenser, and the pump in the mentioned order to form a Rankine cycle; and a power recovery machine connected to the expander,
the operating method comprising:
an evaporation step of, in a state where the expander is stopped, supplying thermal energy of the heating medium directly via the heating medium or indirectly via the working medium to a liquid phase working medium accumulated in a post-expansion space within the expander in which the expanded working medium exists, and thereby evaporating at least a portion of the liquid phase working medium; and
an expander driving step of, when an evaporation condition that the liquid phase working medium accumulated in the post-expansion space has reached an amount equal to or smaller than a reference amount is met, stopping a supply of the thermal energy to the liquid phase working medium and driving the expander.

* * * * *